J. S. WINSOR.
Assignor, by mesne assignments, to S. A. JENKS.
Gate.
No. 8,325. Reissued July 9, 1878.
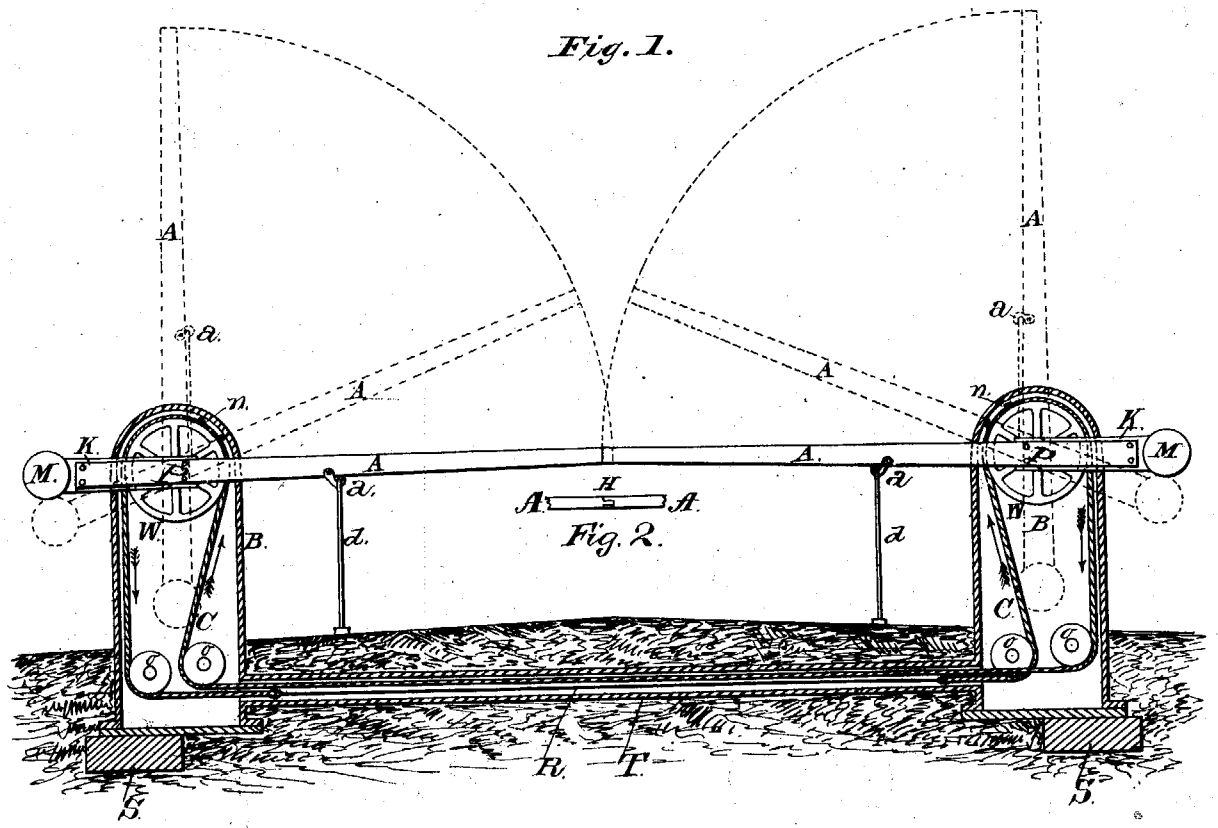
Witnesses:
D. G. Stuart
P. Hannay
Inventor
Joseph S. Winsor
by A. McCallum
Atty.
N. PETERS, PHOTO-LITHOGRAPHER, WASHINGTON, D. C.

UNITED STATES PATENT OFFICE.

JOSEPH S. WINSOR, OF PROVIDENCE, RHODE ISLAND, ASSIGNOR, BY MESNE ASSIGNMENTS, TO STEPHEN A. JENKS.

IMPROVEMENT IN GATES.

Specification forming part of Letters Patent No. 151,260, dated May 26, 1874; Reissue No. 7,451, dated December 26, 1876; Reissue No. 7,897, dated September 25, 1877; Reissue No. 8,325, dated July 9, 1878; application filed March 7, 1878.

*To all whom it may concern:*

Be it known that I, JOSEPH S. WINSOR, of Providence, in the county of Providence and State of Rhode Island, have invented certain new and useful Improvements in Gates; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 of said drawings is an elevation of my improved gate, partly in section, to show the interior mechanism by means of which it is operated. Fig. 2 is a plan view of the adjacent ends of the gate-bars when closed.

My improved gate can be used to close or bar any opening of ordinary width, like farm-gates, &c., but is especially adapted for use in closing or barring spaces of greater width, such as are found at railroad and street crossings, ferries, &c. The light construction of the gate-bars and their perfect balance insure easy operation, so that when two or more bars or sets of bars are connected together by mechanism, as hereinafter described, they can all be operated simultaneously with facility, and thus close or bar spaces of comparatively great width.

The gate shown by the drawings is formed of two bars, A, which are pivoted so as to swing vertically, the pivotal points being at each side of the passage-way and arranged relatively, so that the inner ends of the gate-bars come together in the center of the roadway or opening. The outer ends of the bars A are weighted, in any convenient manner, so as to balance the longer parts, which extend over the roadway; and the arms being straight, and the weight in the same line, the balance is the same, or is not disturbed, whatever degree of inclination they may be made to assume. The path of motion or movement of the bars is indicated by the broken lines shown by Fig. 1 of the drawings.

The movement of the bars being, as shown and described, in vertical planes, the operation of swinging the gate does not occupy what might be available space, as in laterally-swinging gates, the operation of which might, in many instances, impede travel. The pivots or shafts to which the bars A are secured, and with which they turn or rotate, may also form the axes of the wheels W, or the latter may have independent axes or shafts, and be made to rotate the shafts to which the arms A are attached by suitable gearing chains, links, or other suitable connections.

By means of ropes or chains C, or chains or ropes in combination with rods R, a connection is made between the wheels W and gate-arms A, so that any motion imparted to one of the gate arms or bars is communicated to the other or corresponding bar, both moving together and preserving their relative positions. Provision is made for taking up the slack of the ropes or chains, and so as to adjust the bars A to their proper relative positions. The nuts and screws *n* are intended to be used for this purpose; but, as will be evident, whatever device is used to make this adjustment should be so placed in the casings or hollow posts B as to be conveniently reached, and therefore I provide an opening through said hollow posts or standards B, which may be any suitable door, or the top of the casing or hollow post may be made in the form of a removable cover, which I prefer as being most convenient.

The bars A and the shafts to which they are secured, as will be obvious, necessarily rotate in opposite directions, so that the connecting mechanism must be so arranged that the chain or rope passing over the arc of one pulley moves in the opposite direction from that in which it passes over the pulley and band-wheel on the other side of the road or gate-space.

The direction or path of motion of the connecting chain or rope and intermediate ends is shown by the arrows in Fig. 1 of the drawings.

By means of pulleys O journaled in the lower ends of the hollow posts B, the ropes or chains are brought below the grade of the road, so that communication can be made between the hollow posts through the connecting pipe or tube T, which, as shown by the drawing, is laid beneath the surface of the crossing or road. This tube T not only serves as a casing for the connecting rods, chains, or ropes, but also serves as a stay or brace for the hollow posts B, and said posts and the connecting-tube T being water-tight, as shown, complete protection is afforded for the operating mechanism against accumulation of dust, snow, ice, or other matter, which might injuriously affect the operation of said mechanism. Further, it will be seen that all the movable parts, except the bars A, are thus protected.

The hollow casings B, which, as before described, serve as gate-posts, are constructed preferably of metal, all sides being tight to prevent all entrance of dust or leakage of water, as before described; and in placing them in position I prefer to employ sleepers, the ends of which are shown at S.

The tube or pipe T I prefer to make of iron piping.

The bars A may be made of wood firmly fastened to metal sockets K, which are secured to and so as to turn with the pivots or shafts P. The sockets K are continued past the pivotal point and form a support for the counterbalance-weights M, which may be formed by massing the metal at that point.

The downward movement of the bars A is checked and the bars supported by the rods *d*, which are pivoted or hinged to the bars, as shown at *a*, and the descent of the bars may also be further arrested by making them a little longer than half of the distance they are designed to bar, so that they will come together before they reach a vertical plane, and be arrested by their ends abutting; and, further, the ends may be made to interlock by a tongue-and-groove joint, as shown at H, or in any other convenient or suitable manner.

If it is desirable to close or bar the crossing or passage more effectually than can be done by the bars A A, other similar bars may be used and operated in the same manner by being connected with the bars herein described and shown by the drawings.

I am aware that vertically-swinging gates have been heretofore known and used, and I am also aware that such vertically-swinging gates have been counterbalanced by weights, so as to render them more easy of operation; but I do not know that prior to my invention any gate consisting of bars pivoted to posts or standards, and made so as to move with their pivots or shafts journaled in the posts, and connected by suitable mechanism, so that all the bars may be operated simultaneously, has ever been patented or described in any printed publication.

I therefore claim as my invention, and which I desire to secure by Letters Patent—

1. A counterbalanced gate arm or bar, rigidly secured to and so as to turn with its pivotal bolt or shaft, said shaft being journaled to a post or standard, B, substantially as and for the purpose specified.

2. A gate consisting of the vertically-swinging bars A A, pivoted or journaled to the posts B, substantially as described, and connected together by means of ropes or chains, rods, and pulleys, or other suitable mechanism, so as to operate simultaneously, as set forth.

3. The combination of the hollow posts B with a lateral connection, T, for the protection of the operating mechanism, substantially as set forth.

4. The combination of the bars A with the pivoted supports *d*, substantially as and for the purpose specified.

5. The vertically-swinging gate-bars A, arranged so as to come in contact before they reach a horizontal position, and thereby arrest or stop their downward motion, substantially as set forth.

6. The bars A, having their ends constructed so as to interlock when closed, substantially as and for the purpose specified.

In testimony that I claim the foregoing I have hereunto set my hand this 4th day of February, 1878.

JOSEPH S. WINSOR.

Witnesses:
JOSEPH A. MILLER,
AMOS A. WHITE.